F. W. JANTZEN.
SLED RUNNER FOR WHEELED VEHICLES.
APPLICATION FILED JULY 19, 1918.
1,286,330.
Patented Dec. 3, 1918
2 SHEETS—SHEET 1.
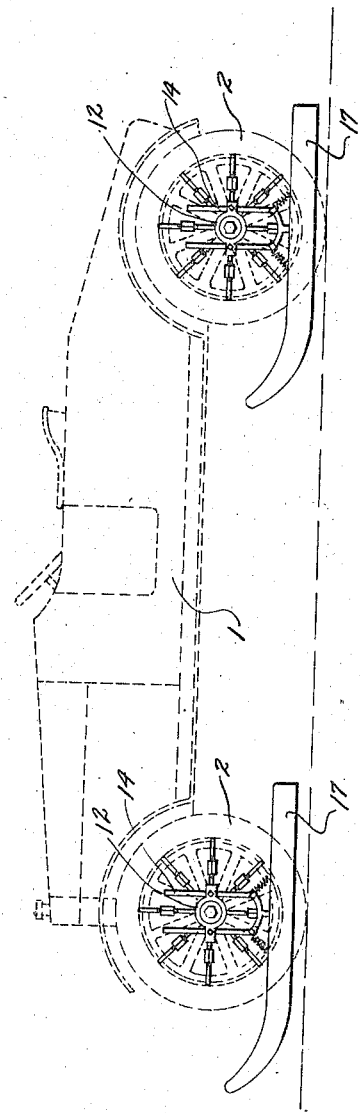
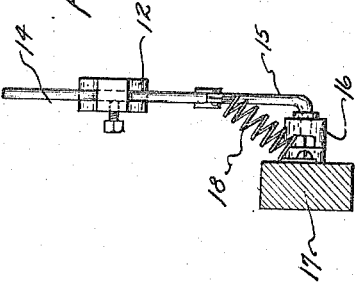
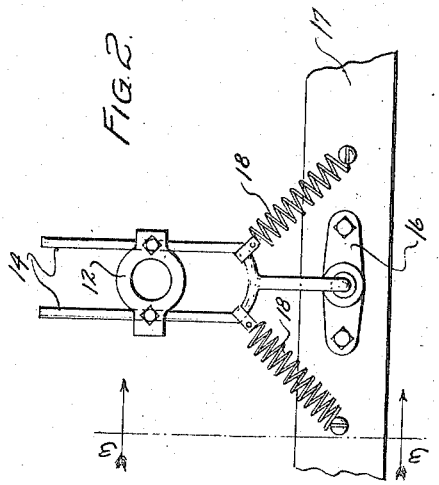

F. W. JANTZEN.
SLED RUNNER FOR WHEELED VEHICLES.
APPLICATION FILED JULY 19, 1918.

1,286,330.

Patented Dec. 3, 1918.
2 SHEETS—SHEET 2.

WITNESSES

INVENTOR

BY    ATTY.

UNITED STATES PATENT OFFICE.

FRITZ W. JANTZEN, OF FERGUS FALLS, MINNESOTA.

SLED-RUNNER FOR WHEELED VEHICLES.

1,286,330. Specification of Letters Patent. Patented Dec. 3, 1918.

Application filed July 19, 1918. Serial No. 245,691.

*To all whom it may concern:*

Be it known that I, FRITZ W. JANTZEN, a citizen of Germany, residing at Fergus Falls, in the county of Otter Tail and State of Minnesota, have invented certain new and useful Improvements in Sled-Runners for Wheeled Vehicles, of which the following is a specification.

This invention relates to improvements in motor vehicles and its chief object is to provide a motor vehicle equipped with both wheels and runners so that it may travel readily over snow, ice or ordinary road beds. A further object is to provide a motor vehicle provided with both wheels and runners in which the runners are readily adjustable with relation to the wheels. A further object is to provide a machine of this type of simple construction that is no more expensive to manufacture than the ordinary motor vehicle. With the foregoing and other objects in view the invention consists in the combination and arrangement of parts to be hereinafter fully described, pointed out in the appended claims and illustrated in the accompanying drawings which form a part of this specification and in which—

Figure 1 is a view in side elevation of a motor vehicle constructed according to my present invention. Fig. 2 is an enlarged fragmentary view of a portion of a runner and its support.

Fig. 3 is a view taken on line 3—3 of Fig. 2.

Like reference characters denote corresponding parts throughout the several views.

Figure 4:
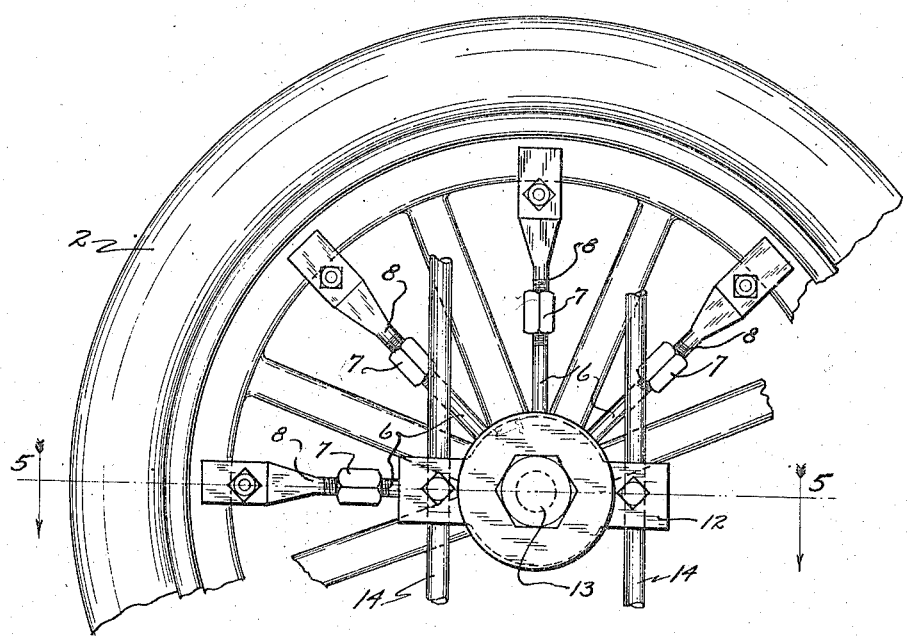
Fig. 4 is an enlarged fragmentary view of a portion of one vehicle wheel illustrating the means employed for securing one runner thereto.
Figure 5:
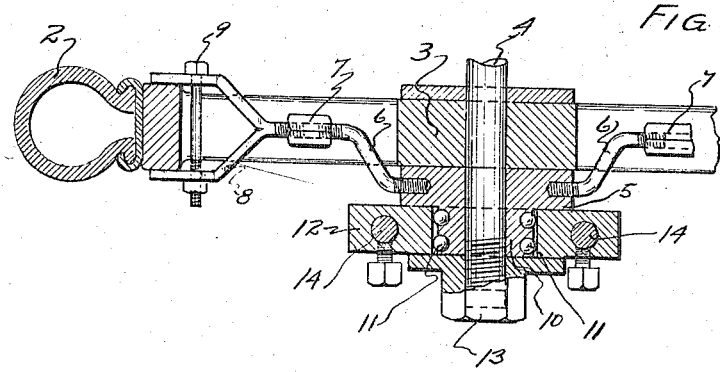
Fig. 5 is a section taken on line 5—5 of Fig. 4.

The reference numeral 1 denotes a vehicle provided with the wheels 2. Against the hub 3 and to the axle 4 of each wheel I apply an auxiliary hub 5 formed with a plurality of threaded sockets which receive the threaded ends of metal spoke sections 6 which spoke sections are connected by the turnbuckles 7 to the Y-shaped spoke sections 8, the forked ends of which are adapted to be secured to the felly of the wheel, each spoke section 8 being provided with an adjusting bolt 9 by means of which it may be tightened upon the felly. Each auxiliary hub 5 is formed with a diminished portion 10 formed with peripheral ball races to receive the ball bearings 11 which ride against the block 12 through a central perforation in which the hub portion 10 extends. A nut 13 serves to retain the block 12 and auxiliary hub 5 in operative position. The blocks 12 are also apertured to adjustably receive the tines or prongs 14 of a fork the stem 15 of which extends into and is supported in a bearing 16 secured to the side of each runner 17. Oppositely disposed shock absorbers 18 connect the fork prongs 14 and the runners 17. By moving the forks 14, 15 relatively to the blocks 12 an adjustment of the runners 17 with relation to the wheels 2 is had. The wheels 2 serve to drive the vehicle in the usual manner, and over ordinary roads the runners 17 are clear of the road. When fairly deep snow is encountered the wheels will sink into the same and the vehicle will ride upon the runners 17 which glide over the snow, the wheels still furnishing the driving power. The wheels may be provided with the ordinary non-skid chains for traction purposes.

What is claimed is:—

1. In a motor vehicle comprising a wheeled body, auxiliary hubs applied to the wheel axles, auxiliary spokes connecting said auxiliary hubs and the wheels, blocks carried by the auxiliary hubs, runners, supporting means for said runners connected to said blocks, and means for adjusting said supporting means and runners relatively to said blocks.

2. In a motor vehicle comprising a wheeled body, auxiliary hubs applied to the wheel axles, said auxiliary hubs being formed with diminished portions, auxiliary spokes connecting said auxiliary hubs and the wheels, blocks formed with central perforations to receive the diminished portions of said auxiliary hubs, runners, supporting means for said runners connected to said blocks, and means for adjusting said supporting means and runners relatively to said blocks.

3. In a motor vehicle comprising a wheeled body portion, auxiliary hubs applied to the wheel axles, said auxiliary hubs being formed with diminished portions, adjustable sectional spokes connecting said auxiliary hubs and the felly of the wheel, means for tightening said spokes to said wheel felly, blocks applied to the diminished portions of said auxiliary hubs, runners, forks adjustably connecting said runners to said blocks, and shock absorbing means connecting said forks and runners.

In testimony that I claim the foregoing as my own I have hereto affixed my signature in the presence of two subscribing witnesses.

FRITZ W. JANTZEN.

Witnesses:
EDITH CRUICKSHANK,
JOHN E. KLEINE.

Copies of this patent may be obtained for five cents each, by addressing the "Commissioner of Patents, Washington, D. C."